United States Patent [19]

Vanus

[11] 3,885,721
[45] May 27, 1975

[54] SPORT FISHING BELT

[76] Inventor: Anthony M. Vanus, 105 Bronn Dr., Claremont, Calif. 91711

[22] Filed: Nov. 30, 1973

[21] Appl. No.: 420,449

[52] U.S. Cl. .............................. 224/5 E; 224/26 R
[51] Int. Cl. ................................................ A45f 5/00
[58] Field of Search ............ 224/5 E, 5 R, 5 A, 5 B, 224/26 R, 26 B

[56] References Cited
UNITED STATES PATENTS

| | | | |
|---|---|---|---|
| 1,720,982 | 7/1929 | Van Brunt | 224/5 E X |
| 2,298,694 | 10/1942 | Haislip | 224/5 E |
| 3,009,612 | 11/1961 | Fischett | 224/5 E |
| 3,115,997 | 12/1963 | Hengst | 224/5 E |

*Primary Examiner*—Robert J. Spar
*Assistant Examiner*—Jerold M. Forsberg
*Attorney, Agent, or Firm*—Boniard I. Brown

[57] ABSTRACT

A sport fishing belt with universal rod holder. The belt with attached receptacle can receive a rod. A displaceable pin is insertable through apertures in the sides of the receptacle. The rod can receive the slotted gimbal end of a gimbal rod. A cup is provided with apertures so that it can be pivotally carried by the rod in position in the receptacle, the cup being adapted to receive the butt of a rod without gimbal end or to receive a slotted gimbal within the cup.

1 Claim, 8 Drawing Figures

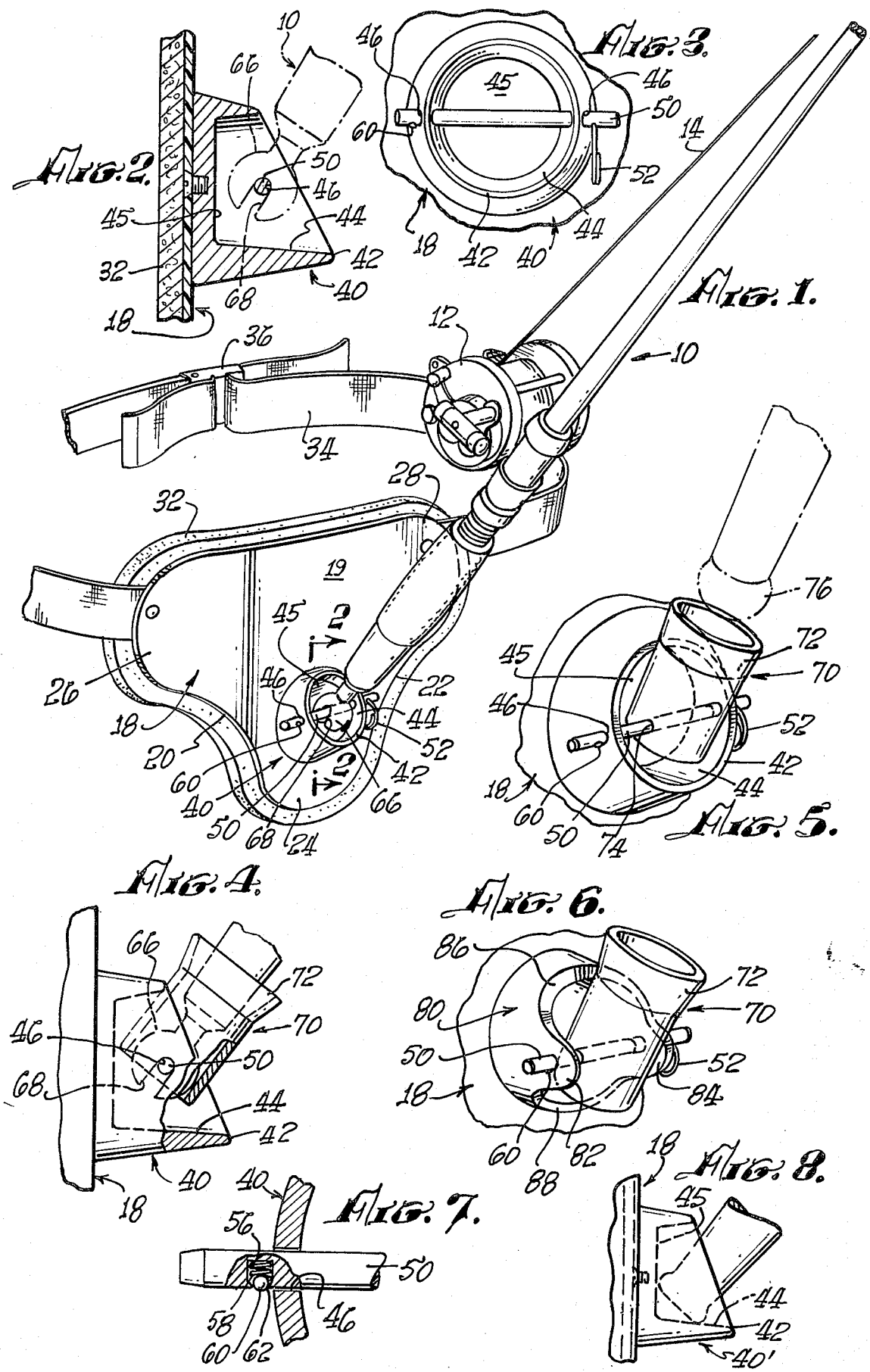

3,885,721

SPORT FISHING BELT

SUMMARY OF THE INVENTION

The invention is an improved sport fishing belt having a pad and receptacle means to receive the fishing rod or pole.

The fishing belt is provided with a specially contoured and padded backing plate for the receptacle that holds the rod. The holder for the pole or rod butt is constructed to be universally adapted to the different preferences the sport fisherman user may have as to the manner of holding the rod. On the belt the pad or plate is provided with a receptacle which can receive an ordinary rod butt. A displaceable pin can be inserted through apertures in the receptacle. The pin is adapted to receive the slotted gimbal end rod. Additionally, the cup is provided with apertures so that it can be pivotally mounted on the rod held by the receptacle. The cup can then receive the ordinary rod butts or slotted gimbal ended rods. The user thus has his preference of one universal assembly of the various types or manners of holding the rod.

BACKGROUND OF THE INVENTION

Prior known patents are U.S. Pat. Nos. 1,451,732; 3,009,612; 3,115,997.

In the light of the foregoing the objects of the invention are to make available an improved fishing belt equipped with receptacle plate having a particular contour design and a back padding to provide full comfort while in use in fighting a fish while either sitting or standing without interference with the user's legs. Particularly the purpose is realized of a rod holder that can be used in any position of the fisherman without its cutting into his legs or groin. It enables the fisherman to use it comfortably while sitting also.

A further object is to realize a universal rod holder which is readily adaptable for use in a fixed receptacle to receive a rod butt and a fixed receptacle to receive a slotted gimbal rod end; a cup pivotally movable 180° in a vertical plane and adaptable to receive an ordinary rod butt or a slotted gimbal at the rod end.

Further objects and additional advantages of the invention will become apparent from the following detailed description and annexed drawings wherein:

FIG. 1 is a pictorial view of a preferred form of the invention showing the displaceable rod in place in the receptacle in receiving the slotted gimbal rod end;

FIG. 2 is a sectional view taken along the line 2—2 of FIG. 1;

FIG. 3 is a detailed view illustrating the displaceable or removable holding rod with ball detent;

FIG. 4 is a view partially in section similar to FIG. 2 showing the receptacle with displaceable rod and cup in place;

FIG. 5 is a pictorial view similar to FIG. 4 illustrating the cup receiving rod butt;

FIG. 6 is a view of a slightly modified form of the invention;

FIG. 7 is a detailed sectional view illustrating the ball detent used in a displaceable rod;

FIG. 8 is an elevational view of a modified form of the invention not having the displaceable rod.

The preferred embodiment of the invention is shown in FIGS. 1, 2 and 3. Numeral 10 designates a conventional fishing rod carrying a conventional reel 12 and line 14. The holder 18 of the invention embodies a plate 19 having a contour as illustrated in FIG. 1. It may be made of a suitable material such as plastic, metal, fiberglass, or the like. It has transversely arcuate or rounded contour so as to fit smoothly against the user's torso. It also has a particular contour having a concave side parts 20 and 22 and lower rounded contour part 24. The upper transverse parts are smoothly contoured as well as designated at 26 and 28. Secured to the back of the plate is a piece of one-half inch thick rubber neoprene padding 32. The rod holder is securable about the user's body by means of a belt 34 which can be made of nylon for full comfort and support and a quick adjustable buckle 36. The holder as described makes possible realization of the objectives as to comfort described in the foregoing.

Secured to the front plate 19 of the holder 18 is a receptacle 40 having a cross section as shown in FIG. 2. The front face of the receptacle is inclined as shown at 42 and in the form of the invention shown it has a cylindrical pocket 44 having a flat bottom 45.

In the opposite side walls of the receptacle 40 are apertures, one of which may be seen at 46 in FIG. 1 adapted to receive a displaceable rod or pin 50 as may be seen in FIG. 3 through an opening of which a spring lock member 52 may be secured at one end. The other end of the rod has a ball detent in it provided by a transverse bore 56 in the rod in which is fitted a coil spring 58 bearing against a ball 60, the end of the bore 56 being of smaller diameter as designated at 62 to hold the ball in position. The ball 60, of course, has to be forced inwardly against the spring in order for the rod 50 to be retracted through the aperture 46.

The holder as described has various adaptabilities. It can receive a rod butt in the manner as illustrated in FIG. 8. The holder 40' as illustrated in FIG. 8 may be one without the transversely disposed apertures for a holding rod such as the rod 50. FIGS. 1, 2 and 3 show the rod 50 in position in receptacle 40. Rod 10 is of the type having a slotted gimbal end, the gimbal being designated at 66 having a slot as shown at 68 which can be received on the rod 50. The purpose of the slotted gimbal is, of course, to prevent twisting of the rod if subjected to torsional stress allowing swinging of the rod through an arc of 180°.

The preferred embodiment makes possible further adaptability illustrated in FIGS. 4 and 5. Although it may be utilized as described in the foregoing, a further item may be included with it which is in the form of a cup as illustrated at 70 in FIGS. 4 and 5. The cup is generally cylindrical, the end part, however, being tapered as shown at 72 adapting it to receive the end of a rod. The inner end of the cup has oppositely disposed apertures one of which may be seen at 74 so that it can be pivotally mounted on the rod 50 at one end position in the receptacle as illustrated. Thus the cup can receive an ordinary rod butt on the slotted gimbal end rod and be received in the cup with the slotted gimbal on the rod as illustrated in FIG. 4. Thus, as may be seen, there is made available a universal rod holding assembly which is readily adapted to whatever the fisherman's preference is to the manner or form of holding the rod. Different fishermen have definite preferences in this regard, and the assembly as described provides a maximum of versatility in this respect, different ways of holding different types of rods being clearly manifested in the foregoing. Additionally, the unique contour and construction of the pad makes for maximum comfort, the size and contour being such as to spread the force exerted by the pull over a considerable area of the wearer's torso.

FIG. 6 shows a modified form of the invention wherein the receptacle is identified by the numeral 80. In this form of the invention the receptacle is cylindrical and is secured to the front plate 19 on the holder, the front part of the receptacle being contoured as shown having forwardly extending ears or projections 82 and 84 extending from arcuately contoured outer end parts 86 and 88 of the receptacle. The extending ears have oppositely disposed apertures adapted to receive the rod 50 on which the cup 70 can be mounted as described in connection with the previous embodiments or the rod again can receive a slotted gimbal-end rod. The form of the invention shown in FIG. 6 may be utilized with or without the cup 72, with the pin 60 being utilized in both modes.

From the foregoing those skilled in the art will clearly understand the nature and construction of the invention and the manner in which it achieves and utilizes all of the objects as set forth in the foregoing.

The foregoing disclosure is representative of preferred forms of the invention and is intended to be interpreted in an illustrative rather than in a limiting sense and the invention to be accorded the full scope of the claims appended hereto.

I claim:

1. A sport fishing belt comprising a rod holding plate fixed to a belt, the belt being adapted to be secured about the body of the user, the plate having secured thereto a generally cup shaped holder bracket for the fishing rod, the bracket having a pair of diametrically opposed circular holes, a pin having its ends slidably fitting in said holes, said pin extending diametrically across said bracket and being removable from said bracket by endwise movement through said holes, means for releasably retaining said pin in said holes and a cup having diametrically opposed holes slidably receiving said pin, whereby said holder may be adapted to receive the butt end of a fishing rod directly in said bracket by removal of said pin and cup, or adapted to receive the butt end of a fishing rod in said cup by installation of said pin and cup in said bracket, or adapted to receive a slotted gimbal on the butt end of a fishing rod with said pin engaging in the gimbal slot by installation of said pin only or both said pin and cup in said bracket.

* * * * *